Jan. 10, 1939.  H. J. MURRAY  2,143,711
AUTOMATIC VARIABLE SPEED POWER TRANSMISSION DEVICE
Filed May 17, 1937
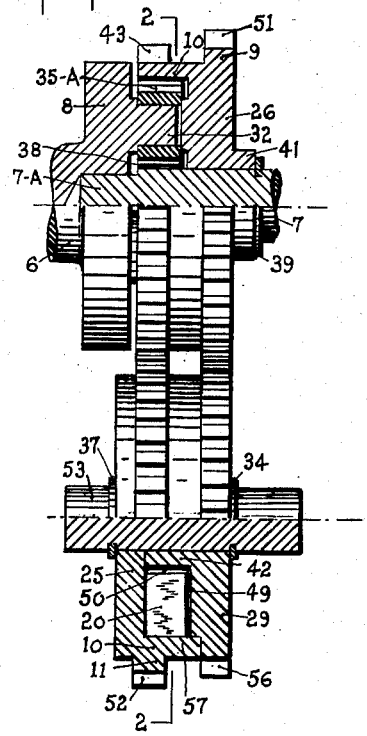
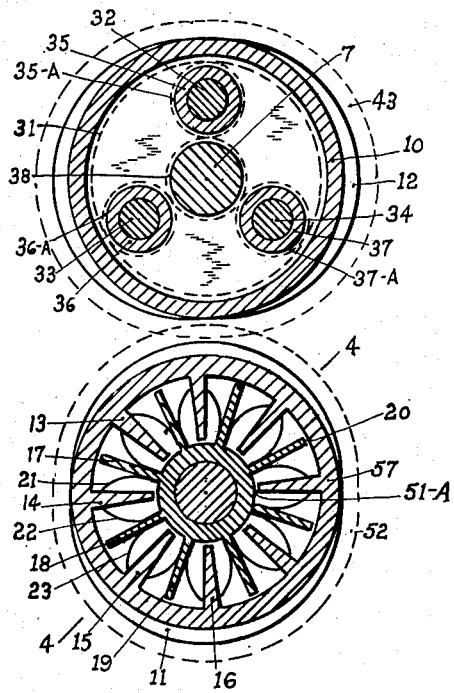
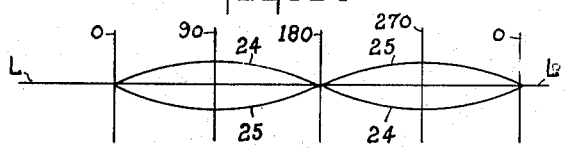
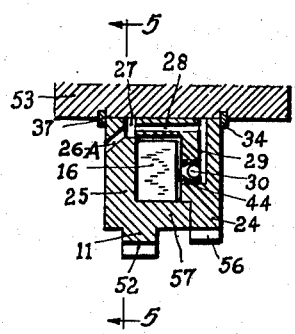
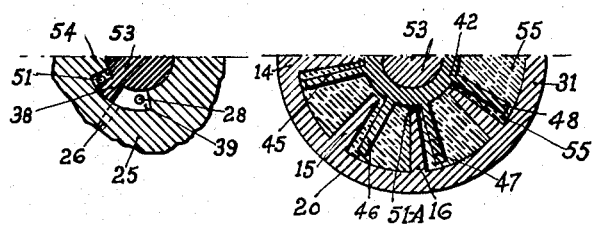
INVENTOR
Howard J. Murray.

Patented Jan. 10, 1939

2,143,711

UNITED STATES PATENT OFFICE 2,143,711

AUTOMATIC VARIABLE SPEED POWER TRANSMISSION DEVICE

Howard J. Murray, New York, N. Y.

Application May 17, 1937, Serial No. 143,017

19 Claims. (Cl. 74—293)

The present invention relates in general to an automatic variable speed power transmission mechanism, and specifically relates to a device for automatically effecting and affecting universal drive relations between driving and driven members of a power transmission device.

One of the objects of the present invention is to provide a simple form of mechanism arranged to derive power from the driving member and thence automatically employ the derived power to effect and affect the driving relations of the mechanism members.

A further object of the present invention is to provide an automatic speed drive transmission arranged so as to be automatically controlled in its universal speed drive relations by self-energizing speed control elements deriving power from one of the members as a function of the relative movement of the members.

An additional object of the present invention is to employ a self-retarded control couple to effect and affect the transmission of power from a driving member to a driven member under such conditions that the speed of the driven member may be relatively varied to acquire a proper speed-torque relation with the driving member.

A still further object of the present invention is to provide a self-acting couple including self-energizing elements arranged to be automatically retarded so as to effect an increase of control with increase of relative speed between the said elements.

A still additional object of the present invention is to provide a drive control which will be stationary when the driving and driven members are operating at a prefixed speed ratio under normal load conditions.

The present invention is a development of the disclosure included in my U. S. Patent application, Serial No. 140,150 filed May 1, 1937 entitled "Automatic self-energizing clutch".

While the present invention is obviously capable of use in any location wherein it is desired to transmit power at automatic variable speed from one member to another, the present invention is particularly applicable to a variable speed power transmission device for use in connection with automotive construction, and it is in this connection that the embodiment of the present invention will be described in detail.

Various other objects and advantages of the invention will be in part obvious from an inspection of the accompanying drawing and in part will be more fully set forth in the following particular description of mechanism embodying the present invention, and the invention also consists in certain new and novel features of construction and combination of parts hereinafter set forth and claimed.

In the drawing:

Figure 1 is a view of an embodiment of my invention partly in vertical section taken axially of the shafts.

Figure 2 is a sectional elevation taken along the line 2—2 of Figure 1 in the direction indicated by the arrows.

Figure 3 is a diagrammatic presentation showing the relative rocking movement of the control elements.

Figure 4 is a partial sectional view in elevation of a modification of the means of Figure 1;

Figure 5 is a sectional view in elevation taken along the line 5—5 of Figure 4 of a modification of the means of Figure 1.

Figure 6 is a partial sectional elevation taken along the line 2—2 of Figure 1 in the direction indicated by the arrows showing a modification of the means of Figure 2.

In the following description and in the claims, parts will be identified by specific names for convenience of expression, but they are intended to be as generic in the application to similar parts as the art will permit.

There is shown by Figure 1 of the drawing an automatic self-energizing control means and associated power transmission elements constituting collectively an automatic speed transmission mechanism and including a pair of shafts 6 and 7 disposed in axial alignment with their adjacent ends including the reduced bearing portion 7—A of the shaft 7 interfitted to provide proper bearing surfaces.

The power shafts 6 and 7 are mounted in suitable conventional bearings (not shown). The shafts 6 and 7 and the member 26 together form portions of a differential drive mechanism as hereinafter described. While either the power shafts 6 or 7 and the member 26 may be considered as the driving member of the mechanism for the purpose of this description, it will be understood that the shaft 6 is the normal driving member and that it is operatively connected to be driven from a source of power (not shown). Accordingly the shaft 7 is regarded as the normal driven member and is operatively connected to whatever mechanism (not shown) it is intended to drive.

The shaft 7 is formed with teeth 38 to operatively receive a plurality of gears 35, 36 and 37 forming together with the annular gear teeth 31 of the portion 26 and the teeth 38 a differential drive set in speed driving relation with the driven member 7 and the driving member 6.

The planet gears 35, 36 and 37 are supported and positioned by the bearing portions 32, 33 and 34 forming an integral part of the flanged portion 8 of the driving member 6. The annular gear member 26 is freely mounted for rotation on the driven shaft 7. With this arrangement it is evident that each planet gear is constantly in mesh with portions of the sun teeth 38 and the internal teeth of the member 26. It is obvious that power may be transmitted by and between the power gear members 6 and 7 by a plurality of transmission paths provided by the planet gears.

The annular toothed member 26 is also formed with a plurality of sets of elliptical spur gear teeth 43 and 51 (see Figure 2). Thus any retardation or acceleration applied to the elliptical teeth will be transmitted through the freely mounted member 26 to the internal teeth 31. The member 26 is positioned on the driven shaft 7 by means of the lock-ring 39.

The sets of elliptical teeth 43 and 51 are constantly in mesh with mating sets of elliptical teeth 52 and 56 forming portions of the disc shaped members 29 and 25 freely mounted on the shaft 53 mounted on bearings (not shown). While the members 25 and 29 are normally freely mounted for rotation on the shaft 53 it is intended that the shaft 53 will be free to rotate in its bearings. The rotatable members 29 and 25 are positioned on the shaft 53 by means of the lock-rings 34 and 37. The member 29 is formed with an axially extending cylindrical portion 42 fitted to freely rotate on the shaft 53.

Both of the members 29 and 25 are formed with a plurality of radially extending fins or blades. The member 25 is provided with fins including portions 13, 14 and 15 and 16 extending radially inwardly from the common portion 57 so as to slightly clear the surface of the portion 42 of the member 29. The member 29 is formed with an equal number of radially outwardly extending fins or blades including portions 17, 18 and 19 slightly clearing the inner curved surface of the portion 57 of the member 25.

The fins of the members 29 and 25 are spaced apart an operating distance determined by the elliptical action of the elliptical gear sets 43—52 and 51—56 disposed to impart a relative rockable movement to the sets of fins attached to the members 25 and 27 as they rotate about the shaft 53. Resilient elements 21, 22 and 23 are attached to the fins 17, 18 and 19 so as to normally position the said sets of fins in a symmetrical relation.

The means of Figure 1 is assumed to be approximately submerged in a transmission lubricant contained in a transmission casing (not shown) and the space between the sets of fins is assumed to be normally filled with this lubricant.

In Figure 4 there is shown a means for insuring a supply of this lubricant between the fins. The section of Figure 4 is taken along the line 4—4 of Figure 2. An oil duct 26—A conducts the lubricant to the chamber 39 (see Figure 5) cut into the member 25. An extending piston portion 38 of the member 24 moves in this chamber when the elliptical gears rock the members 24 and 25 relative to each other. Oil duct 28 conducts the oil to the passage 29 and thus to the oil valve including the ball 30 and the retainer 44.

In Figure 6 there is shown a modification of the means of Figure 1 and Figure 2 wherein the resilient members 21, 22 and 23 of Figure 2 are removed and one or both sets of fins are provided so as to flex under conditions of excessive torque.

In operation, let it be assumed that the normal driving shaft 6 of Figure 1 is given rotation, and that this rotation is clockwise. If the load resistance of the normally driven member 7 is normal the resilient members 21, 22 and 23 will react to prevent the sets of fins, 13, 14, 15 and 16 and 17, 18 and 19 from moving toward each other to any appreciable extent. There will be a slight initial movement of the sets of fins out of symmetry as member 6 starts to rotate but when this displacement is reached the member 26 will be approximately stationary. With proper resistance of the resilient members 21, 22 and 23 for a given load resistance the member 26 will be stationary.

Because of the differential relation of the members 6, 7 and 26, it is true that the member 7 must rotate clock-wise if the member 6 is rotating clock-wise with the member 26 stationary. Thus the members 6 and 7 are rotating clock-wise at a speed ratio determined by the ratios of the differential gear set of Figure 1. It is obvious that any conventional or known method of providing differential sets may be used without departing from the spirit of the present invention, and that the members 6 and 7 may be provided to rotate at the same speed when the member (or equivalent) 26 is held stationary.

Now let it be assumed that the load resistance of the driven member 7 is increased to the extent that the resilient members 21, 22 and 23 can no longer prevent the relative rockable movement of the members 29 and 25 when actuated by the elliptical gear sets 43—52 and 51—56 in turn energized by the member 26 because of the reaction of the gears 32, 33 and 34 against the internal teeth 31.

When the member 26 rotates the sets of elliptical gears (see Figure 2) will rock the members 29 and 25 as they rotate about the shaft 53 and the sets of fins 13, 14, 15 and 16 and 17, 18 and 19 will rock relative to each other as they also rotate about the shaft 53.

The resilient members 21, 22 and 23 will be flexed by the rockable motion. While the resilient members will offer resistance against flexing it will be noted that each rocking motion permits the unflexing of one set of resilient members as another set are flexed, and thus the total resistance of the resilient members for a complete revolution of the member 26 will be limited. It should be noted at this time that the principal reason for the employment of the resilient members is to normally hold the member 26 stationary under normal power transmission periods.

As hereinbefore stated the space between the sets of fins is normally filled with the lubricant used for the transmission mechanism and the fins are provided with clearances at the ends. As the sets of fins are rocked relative to each other this oil must necessarily pass from one enclosure to another through these orifices or clearances. The rate at which this transfer is effected will depend of course upon the area of the clearances and the pressure applied to the said lubricant. The power required to create the pressure to force the oil from one enclosure to the other is derived from the member 26 which in turn derives the power from the members 6 and 7.

Thus the limited or restricted passage of the oil from one fin enclosure to the next will constitute a resistance or retardation to the rotation of the member 26, and thereby a resistance of the internal teeth 31 to being driven by the teeth of the gears 32, 33 and 34 actuated by the normally driving member 6 when driving.

The reaction of the teeth of the gears 32, 33 and 34 is proportional to the resistance of the teeth or splines 38 of the normally driven member 7. Thus, the resistance of the driven member 7 is transmitted to the member 26 and thereby to the sets of fins of the members 29 and 25 and is automatically employed according to the present disclosure to cause the control means including the sets of fins and the inclosed lubricant to derive power from the normally driving member 6 to build up a control retarding resistance in the lubricant to act to force the member 6 to drive the member 7.

According to accepted laws in the art of hydraulics the resistance of the oil to transference from one enclosure to another (the orifices 20 and 51—A remaining constant in area) will increase proportional to the rate or frequency of such transference, or the frequency of the rocking movement between the sets of fins.

Thus the control pressure created in the oil between the fins moving toward each other will be proportional to the relative speed of movement of the fins, and the relative speed of rockable movement of the fins will be determined by the speed of the member 26 in turn determined by the relative speed of the driving member 6 and the driven member 7.

For the purpose of this description, let it be assumed that the speed of the normally driving member 6 is constant. As the load resistance on the normally driven member 7 is increased its speed will decrease and the speed of the differential member 26 will correspondingly increase. In this event the speed of rotation of the member 29 and member 25 will increase, and the frequency of the rocking movement of the fins will increase. The rocking movement will increase in speed also and the pressure created in the oil will thus increase between the fins moving toward each other. The speed of the member 26 and thus the frequency of the rocking motion is always in definite relation to the speed difference in the members 6 and 7 and thus the control resistance pressure in the oil is a function of the difference in speed of the driving and driven members 6 and 7.

Thus the oil derives pressure creating power from the driving members 6 proportional to the load on the driven member 7. This action is automatic. The control means uses the power transmitted from the driving member to build up a resistance in the control means against being driven by the driving member. In other words the control is a self-energizing device, and this self-energizing action is initiated by the resistance of the driven member. This is true since absence of load on the member 7 would mean absence of reaction against the internal teeth 31.

While the motion given to the oil passing through the orifices may be designated as representing kinetic energy the pressure of the oil resisting the movement of the enclosing set of fins toward each other is static pressure, and it is the pressure created in the oil that tends to prevent rotation of the member 26. The amount of oil or lubricant under transfer motion at any given instant compared to the total amount of oil between the sets of fins is small. It is obvious that if the fins were oil tight no oil could be transferred from one enclosure to the next and the pressure of the oil would soon build up to hold the member 26 stationary and thus cause the driving member 6 to drive the member 7. It should be noted that (under these conditions) a static pressure torque would be balanced against kinetic torque or flow of energy. The proportion of power required to hold the member 26 to cause the driving member 6 to drive the member 7 would be very small compared to the total power transmitted from the driving member to the driven member 7. Thus, the device is very efficient.

The size and position of the oil orifices will be determined by the operating conditions under which the device is installed and operated. Holes may be placed in one set of fins as in members 17, 18, and 19 and in this event the escaping oil may be directed to impinge on the resilient members 21, 22 and 23 for a portion of a given rockable movement to increase the efficiency of the control because the oil impingement pressure would add to the control resistance.

Thus according to the present disclosure I provide a self-energizing control automatically deriving control pressure creating power from the driving member according to the resistance of the driven member to affect and effect speed driving relations between the said driving and driven members.

The fin driving action of the elliptical sets of gears will, of course, cause a varying motion of the rotation of the members 29 and 25. It is, of course, possible to balance the parts of the control in any of the known and accepted methods used in the art of mechanics in order to eliminate vibration. The variation of motion in the members will be balanced at any angular position as will be seen by reference to the diagram of Figure 3. Let the line L—L represent uniform rotary motion. The gear set 43—52 will accelerate the member 25 to the same extent that the elliptical gear set 51—56 decelerates the member 24. This will be seen at angular movements at 0, 90, 180, 270 and 0 (360) degrees. At any instant the member 29 is accelerated or decelerated to the same extent that the member 25 is accelerated or decelerated. There will be two points in each revolution (at 0 degrees and 180 degrees) when the pressure will reverse. This reversal will take place over a very small angular movement of the member 26, and will not be similar to the relative speed curves of Figure 3 of the members 29 and 25.

If the lubricant is properly maintained in the enclosures formed by the sets of fins extending from the members 29 and 25, it is apparent that little or no loose motion will exist during the reversal of the rocking movement. The oil is practically incompressible. Furthermore, more than one set of rockable members as 29 and 25 may be employed and staggered. It is obvious that the control resistance and thus the holding action of the member 26 is increased when the member 26 is moved. Thus, the control torque is amplified or augmented by the increase of the driven member load. The speed of rotation of the member 26 may be increased to permit the necessary differential slippage for a low speed high torque of the driven member 7, but the holding torque of the member 26 is increased proportional to this increase of difference of speed. If the differential arrangement of the particular set of gears shown in Figures 1 and 2 is such that the speed of the normally driven member 7 is twice the speed of the driving member 6 when the member 26 is stationary, then the speed of the member 6 will always be more than twice the speed of the member 7 when the holding control member 26 is rotating. The differential relation shown in Figures 1 and 2 is obviously an arbitary one, and the members 6 and 7 may be provided in differential relation so the member 7 is driven at the same speed when the member 26 (or mechanical equivalent of member 26), is held stationary. In addition the elliptical sets of gears 43—52 and 51—56 may be placed on either of the members 6 or 7 and the member 26 may be employed as the normal driven member.

When the members 24 and 25 are given a relative rockable motion by the member 26 the portion 38 of Figure 5 is also rocked in the chamber 39 formed in the member 25. In this event, oil or lubricant taken in from the oil duct 26 will be forced in the duct 28 to the duct 29. Any oil forced in the duct 51 may be allowed to escape. The pumping action of the portion 38 will force oil or lubricant past the ball 30 and into an enclosure after which the oil will be distributed to the other enclosures through the orifices connecting same. If the enclosures are full, the oil may be allowed to escape through a conventional safety valve (not shown).

If the load on the driven member 7 has increased to a constant maximum, a balance will be reached and the speed of the member 26 will become approximately constant. The holding or retarding action of the oil will become approximately constant, and the driving member will drive the driven member at a relative speed automatically determined by the resistance of the driven member.

If the resistance of the driven member now decreases, the speed of the holding member 26 will correspondingly decrease because the reaction against the internal teeth 31 will be decreased and the oil pressure will be automatically adjusted to a new holding torque pressure. In order to maintain the necessary differential relation the speed of the driven member 7 must necessarily increase. As the resistance of the driven member continues to decrease, the speed of the member 26 will continue to decrease because the reaction against the teeth 31 will continue to decrease and the control pressure of the oil will correspondingly decrease.

Eventually the load resistance on the driven member may decrease to equal the control holding torque inherent in the resilient holding members 21, 22 and 23. Under this condition of driving, the rotation of the control member 26 will approach zero speed and the member 26 eventually will become stationary, and this condition will continue as long as the said normal driving condition continues. The efficiency of the transmission device will be high under these conditions.

By reference to Figure 6 there will be seen a modification of the means shown by Figures 1 and 2 to the extent that the resilient members 21, 22 and 23 of Figure 2 are absent and one or both sets of fins 14, 15 and 16 and 45, 46 and 47 and 48 are provided with some degree of flexibility. For the purpose of this description, let it be assumed that the fins 45, 46, 47 and 48 are provided to be flexed by the oil pressure created in the oil 55. If the resistance of the fins exceeds the normal driving torque, it is obvious that the member 26 would not rotate for normal torque driving conditions when used in connection with the means of Figure 6 and a positive drive would be provided in effect for the said transmission. The clearance of fins from the relatively moving surfaces of the members 29 and 25 would, of course, affect the action to some extent, but it is obvious that the fins may be made approximately oil tight relative to said surfaces.

If the fins are provided so as to flex for less than normal torque conditions, the member 26 will tend to rotate at all times when any appreciable load resistance is applied to the driven member. It should be noted, however, that little or no mechanical friction is present in the control device. The fins are approximately free of the relatively moving enclosure surfaces. The only slipping element in the control is the oil, and the amount of oil actually transferred may be made a minimum with increase of operating oil pressure and the proper design of the elliptical gear sets.

In the embodiment of Figure 6 the oil pressure is the actuating retardance factor and the flexible fins may be provided so as to desirably control and vary the resisting action of the oil. The oil pressure controls the driving relations of the driving and driven members because of power automatically derived from the members to be controlled, and in addition the control is automatically limited or varied by the extent of the power derived from the said members. This is true because the fins, 45, 46 and 47 of Figure 6 may be provided with a degree of flexibility so as to give under a predetermined oil pressure. Thus any oil aperture or orifice formed by the fin will be provided or varied in area by the said flexing action. In this manner the speed ratios of the driving and driven member will be automatically limited, because the oil pressure will be limited. In addition the flexing of the fins of Figure 6 would tend to level the holding torque curve. Or, the fins can be made so rigid as to flex only under abnormal conditions.

When the present transmission is installed on an automotive vehicle the normally driven member 7 may become the driving member at intervals to drive the engine against compression. The load resistance of the member 6 will then act to cause the control to derive power control from the momentum of the normally driven member 7 to force the member 7 to drive the member 6.

When the resilient members of Figure 2 are employed, the change from and to the stationary and movable condition of the member 26 is entirely automatic, and in the same manner the variation of the speed torque driving relations of the driving member and driven member is automatically obtained as a function of the speed of the driving member and the resistance of the driven member.

While I have shown and described and have pointed out in the annexed claims certain new and novel features of my invention, it will be understood that certain well known equivalents of the elements illustrated may be used, and that various other substitutes, omissions and changes in the form and details of the device illustrated and in their operation may be made by those skilled in the art without departing from the spirit of the invention. For example, any known form of differential drive may be used. The members 6, 7 and 26 may be arranged so as to cause over-speed normal driving relations, and any suitable equivalent of the fins or barriers 13, 14, 15, 16, 17, 18 and 19 may be employed.

Having thus described my invention, I claim:

1. The combination in a power transmission including a pair of shafts, means on said shafts adapted to provide a differential drive between the shafts, of self-energizing control means for establishing the desired speed relation between the shafts, said control means comprising normally stationary movable elements having a limited freedom of relative rotary motion about a common axis and associated pressure transmitting liquid means for effecting a control resistance to the relative movement of the said elements, said pressure means actuated by power derived from one of the shafts for augmenting the said resistance as a function of the speed of the said relative movement.

2. In a control device, the combination of means for automatically controlling the speed of a pair of rotating members, said control means including a normally positive brake including elements rockably movable relative to each other when abnormally rotated about a common axis by one of the members, and pressure transmitting liquid means associated with said elements and actuated by power received from the elements for augmenting the resistance of the elements against said abnormal rotation in accordance with the driving resistance of one of the members and the speed of the other member.

3. In a device of the class described, the combination of a pair of power members in differential driving relation, a normally stationary control acting on one of the members for causing the members to approach speed drive relations according to the drive resistance of one member and the speed of the other member, said control including portions having a slight freedom of rotary motion relative to each other during abnormal drive intervals, and pressure resisting liquid means associated with said portions to be energized by same for augmenting the resistance of said portions against said relative rotary movement.

4. The combination in a power transmission including a pair of shafts, gears on said shafts adapted to maintain a drive between the shafts, or self-energizing control means for establishing the desired speed relation between the shafts, said control means comprising a normally positive brake for normal torque conditions and an intermittent clutch during periods of relatively excessive torque, means including shiftable members for varying the self-energizing action of the control means to vary the intermittent drive action of same, and force resolving liquid means associated with the brake and energized by power obtained from same for further varying the intermittent drive control action of the clutch according to the frequency of said drive control action.

5. In combination, a pair of members capable of having relative rotary movement about a common axis, automatic control means for causing the members to approach a speed drive relation, said means including an intermittent drive couple for positively connecting the members in positive drive relation during periods of normal torque and in variable drive relation during periods of excessive torque, said couple including rotatable elements having a limited freedom of relative reciprocatory movement, toothed portions actuated by power derived from one of the members for causing the elements to rotate in said reciprocatory manner, and liquid means associated with the elements and also actuated by power derived from one of the members as a function of the frequency of said reciprocatory movement for creating a control resistance to said rotation to thus tend to cause the elements to approach a stationary condition.

6. The combination in a power transmission including a pair of shafts, gears on said shafts adapted to variably drive one shaft from the other, of self-initiating control means for establishing the desired speed relation between the shafts, said control means comprising two elements having a limited freedom of relative rotary motion as they are rotated about a common axis, said elements adapted to be engaged in stationary positive drive relation during periods of normal torque and in rock-drive relation during periods of higher torque, and further means actuated by power derived from one of the shafts for causing the elements to move into the power drive and out of the rock-drive relations.

7. In a rotor control, the combination of a pair of rotors in differential drive relation, a normally stationary control for causing the rotors to approach the same speed as it is rotated by power derived from one of the rotors, and liquid braking means actuated by said rotation tending to vary said approach as a function of the difference of the speeds of the said rotors.

8. In a gear control organization, the combination of a pair of rotors in differential drive relation, a normally stationary control comprising elements having a limited freedom of relative rotary motion as they are rotated about a common axis for causing the rotors to approach the same speed when rotated by one of the rotors and fluid means associated with the control elements to derive power therefrom according to the said relative rotary motion for augmenting the control action therewith.

9. In a gear control, the combination of a pair of gears in differential drive relation, a normally stationary drive control for causing the gears to approach the proper speed-torque drive relation when rotated by one of the gears, said control responsive to a slightly greater than normal force from the gears for causing the said control to begin to function as an intermittent drive control, and fluid means actuated by the same control according to the frequency of its intermittent drive action to resist said rotation to thereby act to complete said drive relation approach and thus cause the control to function again as a stationary positive drive control.

10. In a device of the class described, the combination with a driving gear and a driven gear, one of which is capable of possession of a relatively high torque force, means connected to one of the gears including co-acting rigid and flexible elements having a limited freedom of relative motion as they are rotated about a fixed axis, a normally stationary clutch for controlling the speed relations of the gears, pressure creating fluid means actuated by power from one of the gears in accordance with the drive resistance of the driven gear and the speed of the driving gear for effecting a relatively powerful control resistance of the clutch when moving, said pressure creating fluid means constituting a control multiplying portion of the clutch adapted to variably react to the resistance of the high torque gear to cause the clutch to function augmentatively to said resistance.

11. A self-energized control for causing a pair of power rotors in differential drive relation to approach the same speed, said control including two elements provided with a limited degree of rockable freedom relative to each other as they are rotated about a common axis by one of the said rotors, pressure transmitting liquid means associated with the said elements for deriving pressure creating power from same to oppose the rockable freedom, and means for maintaining the supply of said liquid.

12. In combination with two rotatable members in differential drive relation, of a normally stationary control actively connected to one of the said members, said control tending to cause the members to approach the same speed when moved by power derived from one of the members, and fluid means actuated by additional power derived from the said motion of the control in accordance with its variation to variably resist such control movement thereby to variably increase the braking action of the control.

13. In a device of the class described, the combination of a pair of rotors mounted for relative rotary movement, a normally positive drive control including elements mounted for relative motion as they are each rotated about a fixed axis and positioned separate from said rotors for causing the rotors to approach the same speed, said control being stationary when the rotors are rotating at a given speed relation and moving when the rotors are rotating at other different driving speeds, said control including means for causing one of the said rotors to force the control into an intermittent drive relation with the other rotor and pressure creating fluid means controlled by the frequency of said relative motion of the control for forcing the control into a limited intense intermittent drive engagement with said other rotor.

14. In a self-energizing control device, the combination of power members forming a differential drive means, a limited control for causing the members to approach the same speed, said control including two elements mounted for rotation about a common axis with a limited freedom of rockable relative movement, means between the members and the control for causing said rotation and said movement when the members are rotating at different speeds, and means deriving power from the relative movement of said elements thereby to oppose said rockable movement and thus react to a limited degree on said control to assist in said approach.

15. In a device of the class described, the combination of a pair of power members in differential drive relation, intermittent drive means for establishing the desired speed relations between the members, and fluid control means for intensifying the said drive action, said control energized by power derived from one of the members as a function of the frequency of the said intermittent drive action.

16. The combination of means including a driving member and a driven member in differential drive relation, a self-energizing flexible rock-drive control couple including resilient means positioned between relatively rockable elements mounted for rotation about a common axis and of the said couple, said elements differentially connected to the said members, and pressure acquiring lubricating means associated with the elements and the members for deriving power from one of the members according to the frequency of the said rockable movement to resist the rockable movement of the couple to cause same to become a variable rock-drive control action of the couple.

17. The combination of a driving member and driven member in differential drive relation, normally stationary rotatable speed control means for causing one member to approach the speed of the other when rotating, said means including relatively movable elements operatively connected to said members to receive therefrom the power necessary to actuate the control means in accordance with the frequency of relative movement of the said elements, said control means arranged for normally placing the members in positive driving relation.

18. The combination of power members in differential drive relation, hydraulic control means including rotatable elements provided with a limited degree of relative rockable movement connected to said members to mechanically and hydraulically receive therefrom the power to actuate said control as a function of the frequency of its rockable movement, said control means being stationary when causing the members to positively drive one from the other at a prefixed relative speed.

19. The combination of a driving and a driven member, an intermittently acting clutch mechanism stationary at times to hold the members in definite driving relation and intermittently moving at other times to effect variable drive relations between the said members, said mechanism including fluid deterrent means resisting the intermittent movement proportional to the frequency of said movement, and means for maintaining the supply of the fluid means and thereby the deterrent action.

HOWARD J. MURRAY.